UNITED STATES PATENT OFFICE.

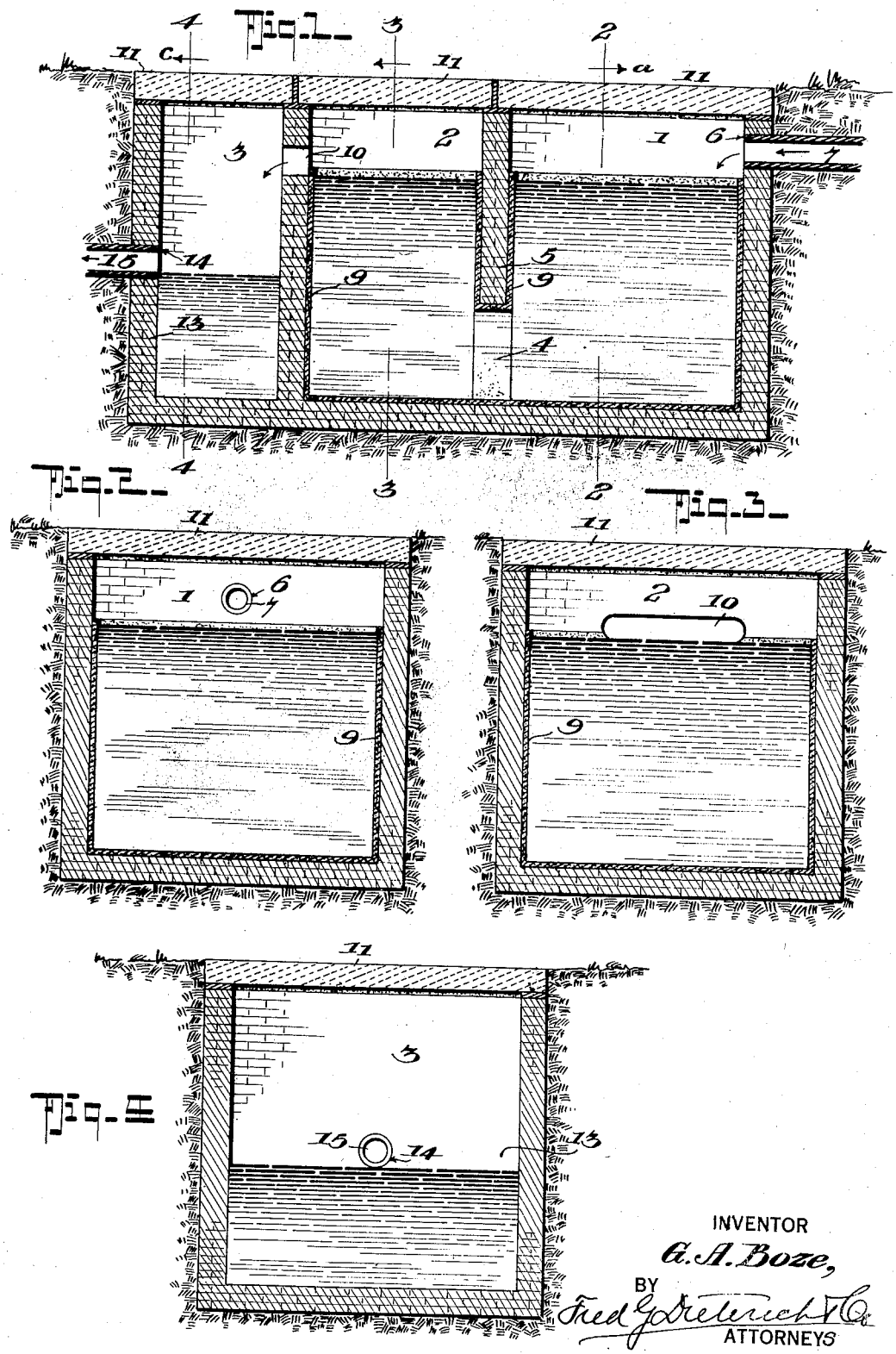

GEORGE A. BOZE, OF NEW ENGLAND, NORTH DAKOTA.

SEPTIC OR CONSUMING TANK.

1,332,882.  Specification of Letters Patent.  Patented Mar. 9, 1920.

Application filed May 17, 1919. Serial No. 297,724.

*To all whom it may concern:*

Be it known that I, GEORGE A. BOZE, a citizen of the United States, residing at New England, in the county of Hettinger and State of North Dakota, have invented a new and useful Septic or Consuming Tank, of which the following is a specification.

My invention has special reference to that class of septic tanks in which the action of bacteria is taken advantage of in converting objectionable organic matters of sewage into an inert organic form.

Primarily, my invention has for its purpose to provide a sewage disposal means of the general character mentioned, more especially designed for use in rural or isolated communities for the hygienic and inexpensive disposal of the sewage and whose structure is such that the same may be readily installed without the requirement of special apparatus.

Another object of my invention exists in the embodiment of certain features, in the practical construction thereof, that make it possible for the heavy or solid portions of the sewage to float on the water, instead of being forced under the water, as is the case in some forms of septic tanks heretofore provided and thereby provide for the microbes setting to work at once on the floating matter before it becomes partly rotted.

With the above and other objects in view that will hereinafter appear, my invention resides in a peculiar arrangement and combination of parts and in the detailed construction thereof, all of which will be apparent from the following description, as specifically set out in the appended claims, and as illustrated in the accompanying drawing which shows a preferred form of my invention and in which:

Figure 1 is a longitudinal sectional view that illustrates a septic or consuming tank embodying my invention.

Figs. 2, 3 and 4 are transverse sections thereof taken on the lines 2—2, 3—3, and 4—4, respectively, on Fig. 1, and looking in the direction of the arrows $a$, $b$ and $c$, respectively.

In carrying out my invention, the tank is constructed of brick and concrete and is preferably of rectangular box shape, and the said tank is divided into three compartments designated 1, 2 and 3, which compartments are of gradually decreasing widths, the first or intake compartment 1 being the largest.

Compartments 1 and 2, in my construction of septic tanks, constitute the consuming or sludge compartments and communicate with each other, at the bottoms thereof, by an arched passage 4 in the partition wall 5.

Compartment 1 is for the reception of all solids and has a round hole 6, in its end wall, located as near the top of the tank as possible, and into which extends the inlet pipe 7.

The walls of the compartments 1 and 2 are rendered waterproof up to the overflow by a concrete lining 8 and the partition wall 9 between compartments 2 and 3 has a horizontally elongated overflow opening 10 and the said opening, in practice, is located below the inlet passage (about three inches), the reason for which will presently appear.

The compartment 3 is hereinafter termed the outlet chamber, since from it the sewage is periodically discharged and is carried away in such manner as conditions warrant.

The whole tank is rendered air tight by a top which may consist of a slab 11, for each section, cemented onto the top edge of the longitudinal and cross walls of the tank and, in practice, each slab may have a manhole (not shown).

The end wall 13 for the chamber 3 has an outlet 14 located some distance below the passage 10, in the wall 9, and preferably in a plane above the arched passage 4.

It is to be noted that in my construction of septic tank, the inlet to the tank is straight and is located near the top of the tank.

This makes it possible for the heavy and solid parts of the sewage to float on the water instead of being forced under the water. The advantage of thus arranging the inlet is that the microbe will set to work at once on the floating matter before it becomes partially rotted and, by such action, the water becomes wholly or mostly sterilized before it passes from the first consuming or sludge chamber under the arched passage into the next sludge or consuming chamber 2.

In chamber 2, the process of consuming is completed and the thoroughly sterilized water passes from chamber 2 into the outlet chamber 3, through the elongated passage 10, that is located in a plane below the inlet to the chamber 1, as before stated.

The advantage in relatively arranging the round inlet to the chamber 1 and the elongated passage 10 from the chamber 2, is that it is impossible to flood the chamber 2, owing to the low location of communication between the chambers 2 and 3.

The advantage stated will be appreciated when it is mentioned that in septic tanks where flooding is possible, microbes and only partially sterilized water is carried over into the chamber 3 with the result that such impurities form a coating in the cesspool or ground in which the water is supposed to seep away, thus preventing, in a short time, such seepage.

The sterilized water is carried away from the chamber 3 through a passage 14 into an outlet 15, through a direct or blind drain.

My construction of septic tank is such that it may be built in any capacity according to the amount of sewage to be handled and it is particularly adapted and designed either for one family use or in rural communities, the structure being such it can be readily built up at a low cost and without going to the expense of employing specially skilled labor or the use of special apparatus or appliance for building the same.

Advantages and capabilities of my invention other than those hereinbefore referred to will be apparent to those familiar with the art to which my said invention relates.

While I have stated that the outlet 14 is preferably located on a level between the openings 4 and 7, it is immaterial where this outlet 14 is located as long as it is at a point below the opening 10.

The several chambers 1, 2 and 3 are progressively reduced in area for the following reasons:

Chamber 1 is the largest because the solid matter as well as liquid first flows into this chamber, the solid matter remains there, hence it requires a large chamber.

Chamber 2 is smaller than chamber 1 because no solid matter flows into and remains there as in chamber 1. All chamber 2 contains is liquid.

Chamber 3 is smaller than chamber 2 because all it will contain is the purified water and the odor as it passes from the second chamber.

In my construction of septic tank, there are no screens or siphons used in connection with it but there is a direct under and overflow without hindrance or obstructions.

What I claim is:

A septic tank having a pair of transverse partitions disposed to produce a primary and a secondary sludge chamber and a chamber adjacent the secondary sludge chamber that receives the purified water, a fluid inlet that opens through the end wall of the primary sludge chamber near the upper end thereof, the partition member between the main and the secondary sludge chambers having a submerged passage at the lower end, the wall between the secondary sludge chamber and the pure water receiving chamber having a passage near the upper end, the outer wall of the pure water receiving chamber having a passage and an attached blind drain, and a closure held air tight on the top of the tank, the primary and the secondary sludge chambers and the pure water chamber being of progressively reduced widths, the passage from the pure water holding chamber being located below the outlet from the secondary sludge chamber and above the submerged passage between the two sludge chambers, the walls of the sludge chambers up to the water line being waterproof.

GEORGE A. BOZE.